No. 682,682. Patented Sept. 17, 1901.
E. F. HAFELFINGER.
MOTOR BICYCLE.
(Application filed Dec. 1, 1900.)
(No Model.) 4 Sheets—Sheet 3.

WITNESSES:
Edward Thorpe
C. R. Ferguson

INVENTOR
Emil F. Hafelfinger
BY Munn
ATTORNEYS

No. 682,682. Patented Sept. 17, 1901.
E. F. HAFELFINGER.
MOTOR BICYCLE.
(Application filed Dec. 1, 1900.)
(No Model.) 4 Sheets—Sheet 4.

WITNESSES:
Edward Thorpe
C. R. Ferguson

INVENTOR
Emil F. Hafelfinger
BY Munn
ATTORNEYS

UNITED STATES PATENT OFFICE.

EMIL F. HAFELFINGER, OF WEEHAWKEN, NEW JERSEY.

MOTOR-BICYCLE.

SPECIFICATION forming part of Letters Patent No. 682,682, dated September 17, 1901.

Application filed December 1, 1900. Serial No. 38,292. (No model.)

*To all whom it may concern:*

Be it known that I, EMIL F. HAFELFINGER, a citizen of the United States, and a resident of Weehawken, in the county of Hudson and State of New Jersey, have invented a new and Improved Motor-Bicycle, of which the following is a full, clear, and exact description.

This invention relates to improvements in bicycles driven by a combustion-motor; and the object is to provide a vehicle of this character that shall be simple in its construction and in which the parts are all assembled so as to require but very little space or not a greater space than that of an ordinary bicycle-frame.

I will describe a motor-bicycle embodying my invention and then point out the novel features in the appended claims.

Reference is to be had to the accompanying drawings, forming a part of this specification, in which similar characters of reference indicate corresponding parts in all the figures.

Figure 1:
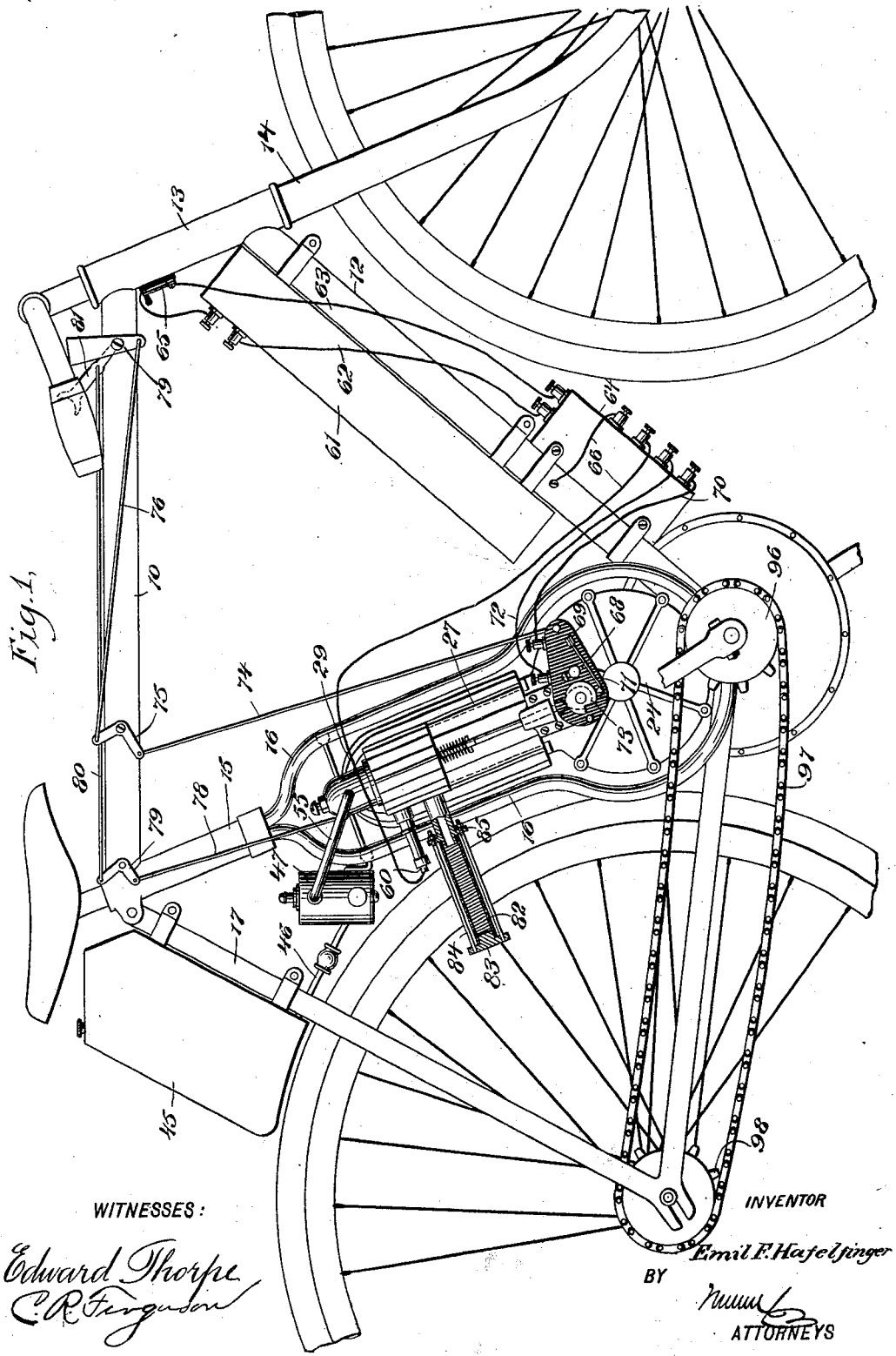
Figure 2:
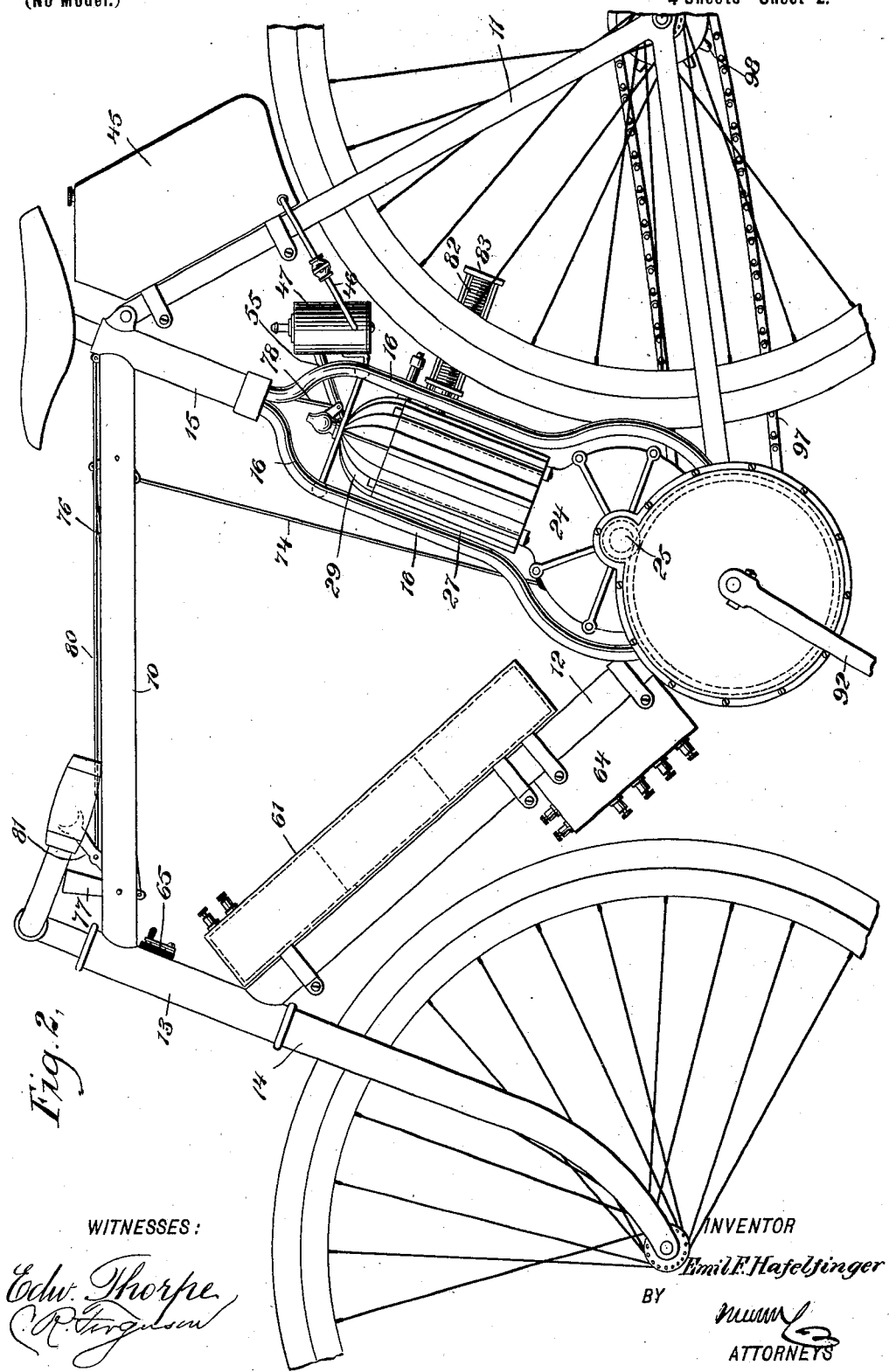
Figure 3:
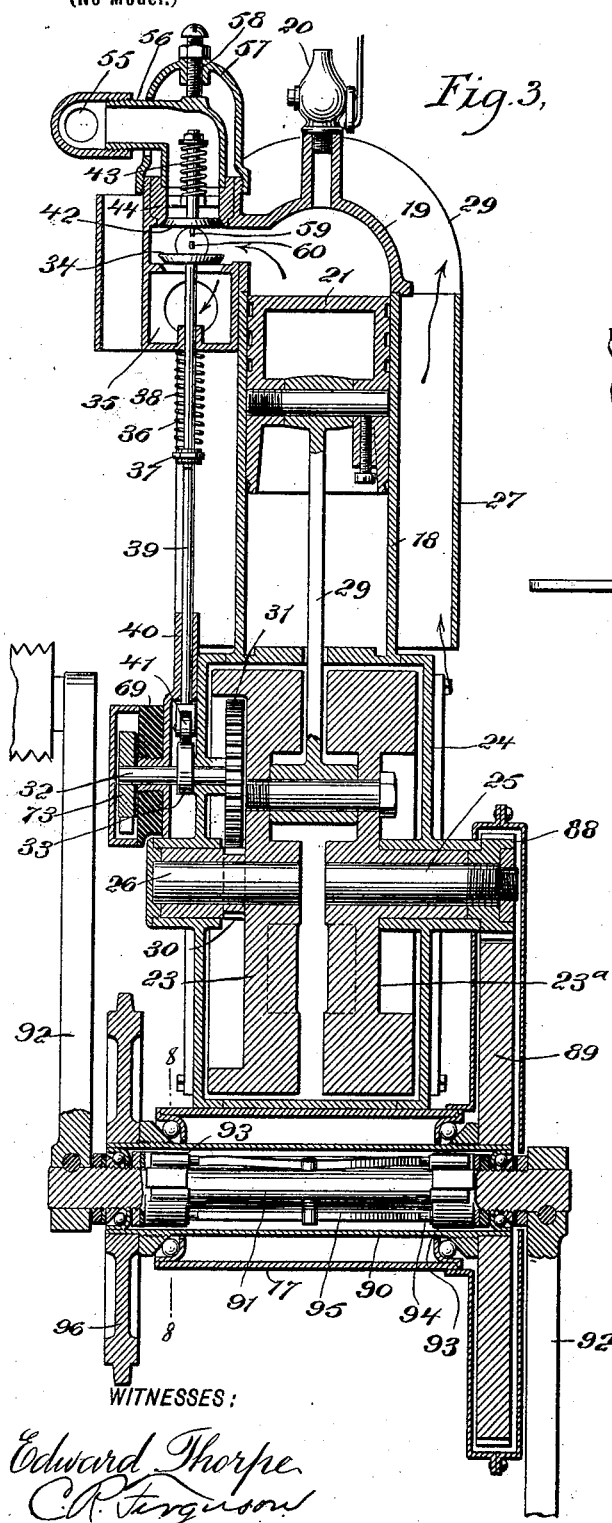
Figure 4:
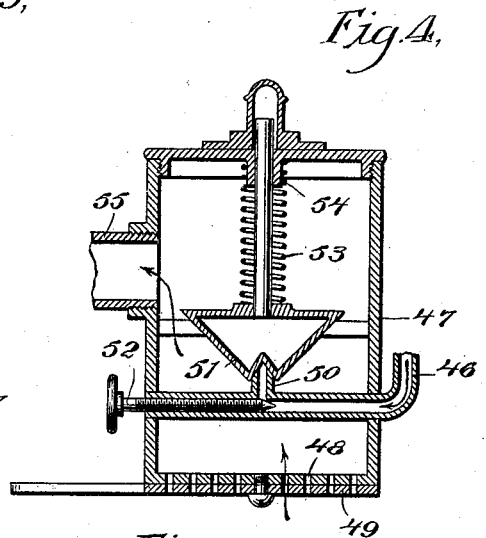
Figure 5:
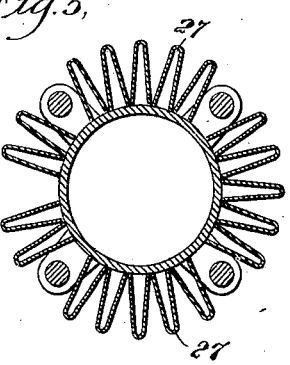
Figure 6:
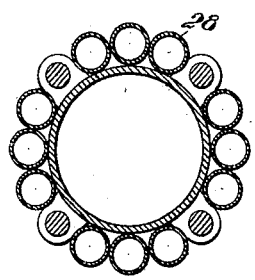
Figure 7:
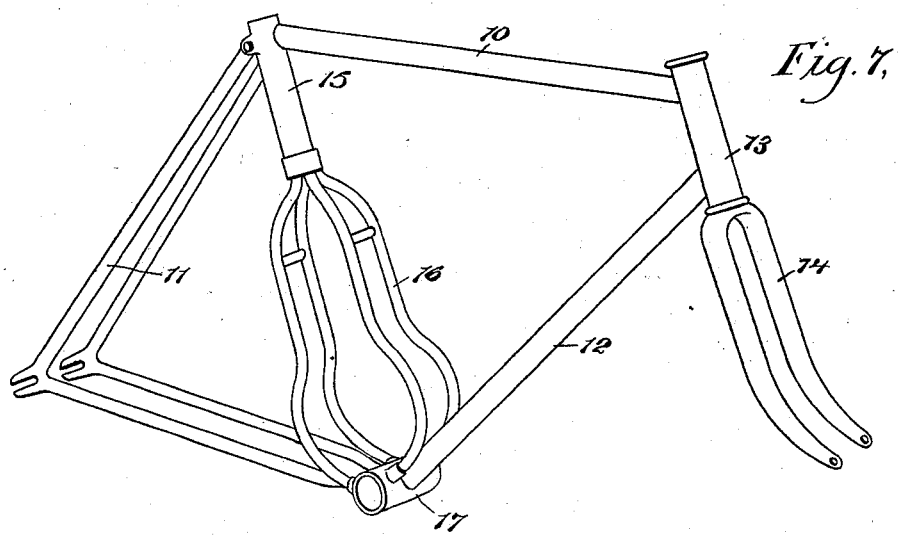
Figure 8:
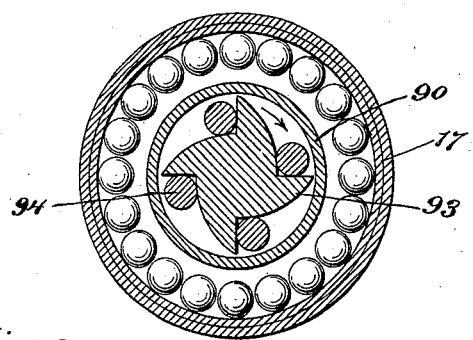
Figure 9:
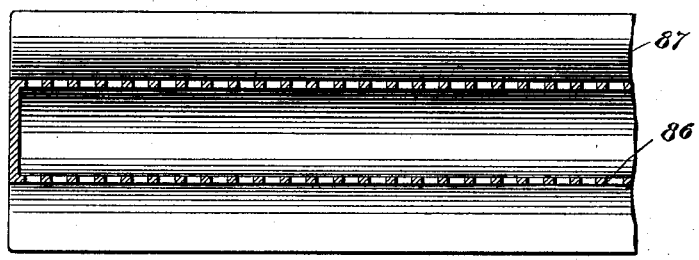
Figure 10:
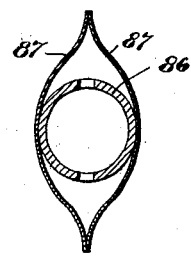

Figures 1 and 2 are opposite side elevations of a motor-bicycle embodying my invention. Fig. 3 is an enlarged transverse sectional elevation through the motor. Fig. 4 is an enlarged transverse sectional elevation of a vaporizer employed. Fig. 5 is a cross-section of the motor-cylinder. Fig. 6 is a cross-section of a cylinder of modified construction. Fig. 7 is a perspective view of the bicycle-frame. Fig. 8 is a section on the line 8 8 of Fig. 3. Fig. 9 is a longitudinal section of a modified form of muffler employed, and Fig. 10 is a cross-section thereof.

The frame of the bicycle comprises the usual top bar 10, the rear fork members 11, the bottom front brace 12, and the socket member 13 for the front fork 14. The central vertical brace comprises the socket 15 for the seat-post and a series of frame-bars 16, which connect at the lower end with the sleeve 17, in which the pedal-shaft is located. This frame 16 is designed to receive and support the motor, to be hereinafter described, and therefore it is obvious that the motor will be arranged between the front and rear wheels of the bicycle, and as the motor is quite small there will be but slight lateral projection, so that it will not interfere with a rider's legs.

The motor comprises a cylinder 18, having a dome-shaped top 19, provided with a valve 20, which upon opening will permit the escape of air when the machine is first started, as will be hereinafter described. Operating in the cylinder 18 is a piston 21, having its stem 22 connecting with fly-wheels 23 and 23ª, located in a casing 24. These fly-wheels also serve as cranks, as the piston-stem 22 is connected therewith at one side of the shafts. One of the fly-wheels is connected to a shaft 25, while the other fly-wheel is connected to a shaft 26, these shafts having bearings in the walls of the casing 24.

To provide for the radiation of heat and keep the interior of the cylinder 18 practically cool, I provide on the outer side of the cylinder a series of vertically-disposed radiating tubes 27, open at the top and bottom. These radiating tubes 27, as shown in Fig. 5, are flattened at the sides and extend radially from the cylinder. In Fig. 6, however, I have shown cylindrical tubes 28, which serve the same purpose. Radiating tubes 29 also extend over the dome portion of the cylinder.

On the hub of the fly-wheel 23 is a pinion 30, engaging with a gear-wheel 31, on the shaft 32 of which is a cam 33, designed for moving the exhaust-controlling valve 34 to its open position. This valve 34 controls the exhaust from the combustion chamber or dome 19 of the cylinder to the exhaust-chamber 35, from which a muffler extends, as will be hereinafter described. The stem 36 of the valve 34 extends downward, and between a collar 37 on the lower end of this stem and the bottom of the chamber 35 a spring 38 is arranged, which is designed to move the valve to its closed position. Engaging with the lower end of this stem 36 is a rod 39, which moves through a guide 40 and has on its lower end a roller 41, which engages with the cam 33. A valve 42 operates to control the entrance of mixed gas and air to the combustion-chamber. This valve 42 is normally held in its seat in the upper wall of the combustion-chamber by means of a spring 43, which surrounds the stem of the valve, engaging at its upper end with a collar on the upper end of said stem and at its lower end with a spider 44.

Supported on the bicycle-frame, as here shown upon the rear fork members, is a gasolene-tank 45. From this tank a pipe 46 leads into the lower portion of a vaporizer-tank 47, also supported on the bicycle-frame. The bottom wall of this vaporizer-tank is provided with a series of perforations 48, through which air may pass, the said perforations or openings being controlled or more or less opened by means of a perforated valve-plate 49, pivoted on the bottom of the vaporizer. Within the vaporizer the pipe 46 has an upwardly-extended outlet-nipple 50, which is controlled by a spring-pressed valve 51, and the passage of gasolene through the nipple 50 may be regulated by a screw-valve 52. The valve 51 is made conical, so as to provide a considerable surface for gas and air pressure required in moving it to an open position. Surrounding the stem of the valve is a spring 53, which bears at its lower end upon the valve and at its upper end engages with a tubular lug 54, attached to the top or cover of the vaporizer. From the upper portion of the vaporizer a pipe 55 leads to a connection with an elbow 56, communicating with the combustion-chamber, this communication being controlled by the valve 42. The elbow 56 may be conveniently held in place by means of a cap 57, having screw-thread engagement with an upward projection from the combustion-chamber, and a screw 58, passing through the top of said cap, engages with the upper side of said elbow, as clearly illustrated in Fig. 3. Leading into the combustion-chamber are two sparking electrodes 59 and 60. The electrode 59 is in electrical connection with the cylinder and the frame, while the electrode 60 is insulated from the cylinder.

Mounted on the bottom brace member 12 of the bicycle-frame is a battery 61, from which wires 62 and 63 lead to the primary of an induction or sparking coil arranged in a casing 64, also attached to the said member 12. In one of the wires, here shown as the wire 63, is located a switch 65, said switch being attached to the member 13 of the bicycle-frame. From the secondary coil a wire 66 leads to a connection with the bicycle-frame, and consequently to a connection with the cylinder and electrode 59, and also from the secondary coil a wire 67 leads to a connection with the electrode 60.

I make and break the current in the induction-coil by a vibrator in the form of a spring 68, mounted on an arm 69, of insulating material, which rocks on the shaft 32. The vibrator 68 is connected with the induction-coil by a wire 70, while a contact-point 71 on the arm 69 is connected to the induction-coil by a wire 72. The vibrator 68 is operated or moved out of contact with the contact-point 71 by means of a cam-wheel 73, mounted on the shaft 32. This cam-wheel 73 has a notched portion which upon reaching the lug on the end of the vibrator allows said vibrator to move upward by its spring action to make an engagement with the contact 71. When the periphery of the cam, however, engages with said lug, the vibrator will be moved out of said contact. The object in mounting the vibrator on a swinging arm is to provide for rocking it with relation to the cam, so that the sparking may take place to ignite the discharge within the cylinder at desired positions of the piston—that is, by moving the outer end of the arm downward the position of the end of the vibrator will be changed with relation to the cam in such manner as to cause the igniting of the charge when the piston is in a lower position than would be the case were the arm moved upward, bringing the end of the vibrator circumferentially in the opposite direction. The arm 69 is moved up or down by means of a rod 74, which extends upward from said arm and engages at its upper end with one member of an angle-lever 75, pivoted to the top bar 10, and from the other end of this angle-lever a rod 76 extends to a connection with a lever 77 on the bicyle member 10. The valve 20 is opened and closed by means of a rod 78, connecting at one end with the stem of the valve and at the other end with an angle or crank lever 79, pivoted to the member 10 of the frame and from which a draw-rod 80 extends to a connection with a lever 81, also pivoted to the said member 10 of the frame.

Connecting with the exhaust-chamber is a muffler, which in Figs. 1 and 2 consists of a closely-coiled spring 82, in the outer end of which is a block 83, from which rods 84 extend and have sliding movement in a collar 85, attached to a tube leading from the exhaust-chamber. As the exhaust passes into the muffler the spring will be slightly expanded to allow the discharge of the exhaust, but will quickly close to prevent the entrance of atmospheric air, and thus prevent the usual noise of exhausting steam or the like.

In Figs. 9 and 10 I have shown a muffler consisting of a tube 86, having a series of perforations at the top and bottom, and connected to the sides of this tube and extended above and below the same are spring-plates 87. The said spring-plates meet at the top and bottom in a practically air-tight manner. The exhausting charge, however, will sufficiently separate them to permit of the escape, and after the escape the plates will close and prevent the entrance of air.

Connected to the shaft of the fly-wheel 23ª is a pinion 88, meshing with a gear-wheel 89, which is connected to the cylindrical pedal crank-shaft 90, which is mounted to rotate in the sleeve 17, and has ball-bearing connection therewith in the usual manner. Extended through the cylindrical shaft 90 is a shaft 91, to which the pedal-cranks 92 are rigidly attached. On the ends of this shaft 91 are outwardly-extended teeth 93, having one straight surface or a surface extended at right angles to the axis of the shaft, while the opposite surface is curved. Rods or bars 94 extend along the shaft 91 and have enlarged ends which engage with the teeth 93, and these enlarged ends are held normally and lightly against the curved surfaces of the teeth by means of springs 95, which are connected at their central portions to the shaft 91 by means of screws or otherwise, while the free ends engage with the rods 94. When the enlarged portions of these rods are in engagement with the curved portions of the teeth 93, as indicated in Fig. 8, the pedal-cranks may be held stationary while the cylindrical shaft 90 rotates freely around the shaft 91. When, however, it is desired to start the machine, the pedal-cranks are to be operated to move the shaft 91 in the direction indicated by the arrow in Fig. 8, which will cause the curved portions of the teeth to gradually engage with the rods 94, forcing them outward into tight frictional engagement with the inner side of the cylindrical shaft 90, so that said shaft will rotate with the shaft 91, consequently starting the fly-wheels and moving the piston 21 until a charge of gas shall have been delivered into the cylinder. On the cylindrical shaft 90 is a sprocket-wheel 96, from which a sprocket-chain 97 passes to an engagement with a sprocket-wheel 98 on the rear wheel of the bicycle.

In operation after starting the bicycle by means of the pedal-cranks, as above mentioned, the valve 20 is to be opened to permit the escape of air that may be within the cylinder. This air will be forced outward by an upward movement of the piston. Upon a downward movement of the piston the valve 42 will be drawn open by suction, and the valve 51 will also be moved by suction out of engagement with the nipple 50, so that the gasolene may pass into the vaporizer and mingle with the air therein. This mixed charge will pass through the pipe 55 into the combustion-chamber, and then when the sparking takes place between the electrodes the charge will be exploded, forcing the piston downward. Then through the momentum of the fly-wheels the piston will be moved upward, it being understood that the pedal-cranks are stationary at this time, and at the same time the cam 33 will move the exhaust-valve 34 to its open position, so that the exploded charge will be forced out by the upward movement of the piston. The piston will be again moved downward through the agency of the heavy fly-wheels drawing in a fresh supply of gas, and then as the piston moves upward by the momentum of the fly-wheels the charge will be compressed and ready to be ignited when the piston reaches its uppermost position. The pinion 30 and the gear-wheel 31 are so related that the exhaust-valve is only opened at every second upward movement of the piston.

Having thus described my invention, I claim as new and desire to secure by Letters Patent—

1. In a motor-bicycle, a frame, comprising a vertical brace member having a socket-section for a seat-post, a series of arms extended downward from the socket-section, said arms being curved outward between their ends and arranged one pair forward of the other pair, and a motor supported between said arms, substantially as specified.

2. In a motor-bicycle, a frame, comprising a top bar, a bottom brace-bar, rear fork members, a vertical center brace having a frame at its lower portion, a motor arranged in said frame, and a gasolene-tank supported on the rear fork members, substantially as specified.

In testimony whereof I have signed my name to this specification in the presence of two subscribing witnesses.

EMIL F. HAFELFINGER.

Witnesses:
EVERARD BOLTON MARSHALL,
C. R. FERGUSON.